Sept. 18, 1945.  R. W. ALLEN  2,385,180
FASTENER
Filed Sept. 30, 1943
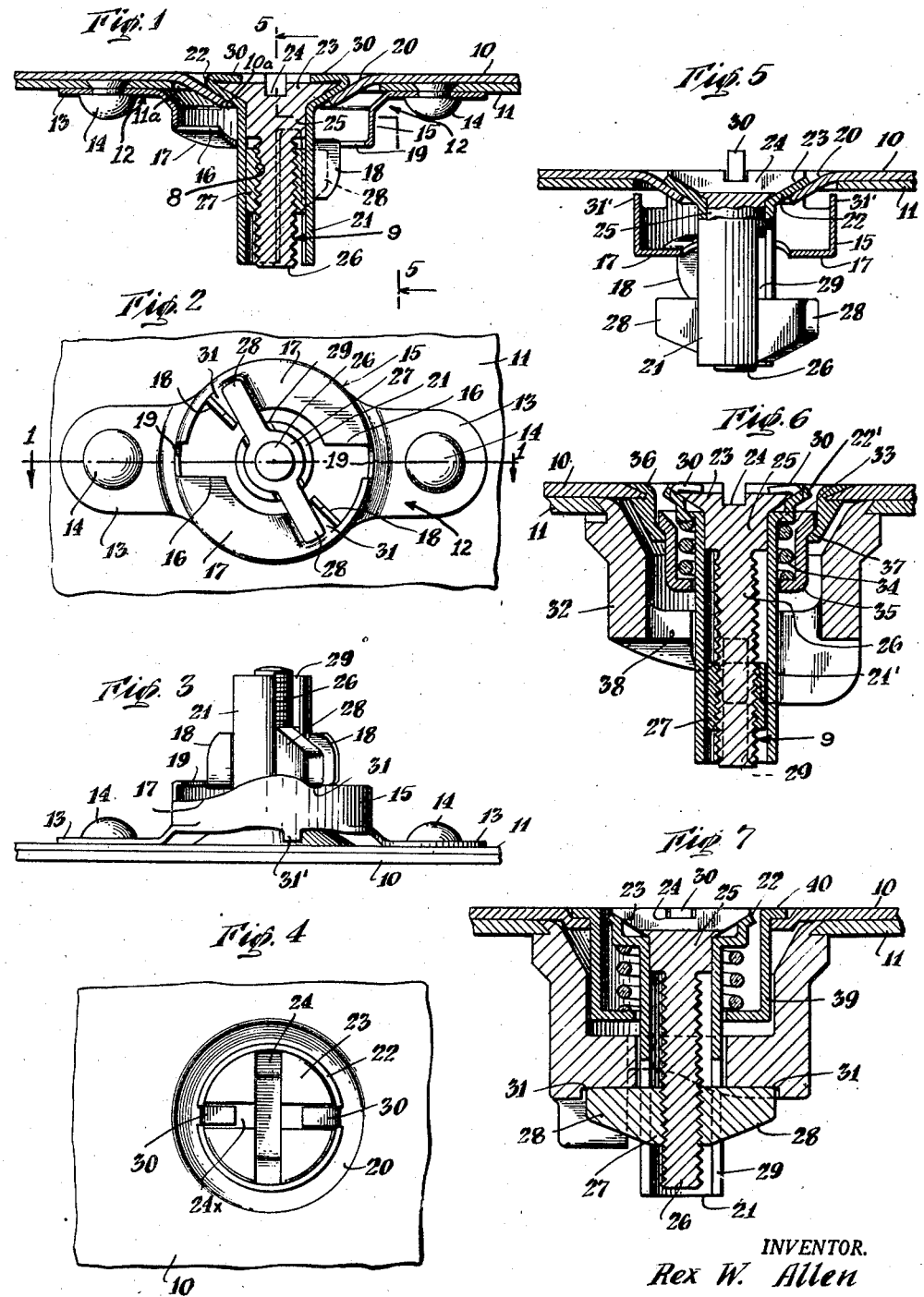
INVENTOR.
Rex W. Allen
BY
ATTORNEYS Patented Sept. 18, 1945

2,385,180

UNITED STATES PATENT OFFICE 2,385,180

FASTENER

Rex W. Allen, Palisades, N. Y., assignor to Camloc Fastener Corporation, New York, N. Y., a corporation of New York Application September 30, 1943, Serial No. 504,367

6 Claims. (Cl. 24—221)

This invention relates to a structurally and functionally improved fastener assembly.

It is an object of the invention to furnish an improved assembly of this type and which may be readily adjusted to conform to different conditions of installation. Therefore, it will be unnecessary to substitute parts in the assembly operation. Rather, it will be feasible to readily make the necessary adjustment, thus saving time and expense of installation.

A further object of the invention is that of designing an assembly by means of which the adjustment may be quickly effected, so that subsequently the several parts of the assembly will cooperate perfectly with each other and in order to maintain sheets or other elements against accidental detachment or displacement with respect to each other.

Still further objects are those of providing a fastener design which will include a collar, as well as a stud, both embodying novel functions and constructions.

Another object is that of furnishing a structure of this type and which will include relatively few parts, each individually simple and rugged in construction, such parts being readily capable of manufacture by automatic methods and machinery so that minimum expense will be involved. Moreover, when these parts are once assembled, unitary structures will be furnished which will function over long periods of time with freedom from all difficulties.

With these and other objects in mind, reference is had to the attached sheet of drawings, illustrating practical embodiments of the invention, and in which:

Fig. 1 is a sectional side view of a fastener taken along line 1—1 of Fig. 2 and looking in the direction of the arrows, and showing the parts thereof in assembled position;

Fig. 2 is a bottom plan view;

Fig. 3 is a side elevation;

Fig. 4 is a top plan view;

Fig. 5 is a sectional view taken along the lines 5—5 and in the direction of the arrow as indicated in Fig. 1, with the parts somewhat separated.

Fig. 6 is a view similar to Fig. 1 but showing an alternative form of construction; and Fig. 7 is a view similar to Fig. 6 and showing a still further form of structure.

This application is primarily dedicated to a structure, by means of which the parts of a fastener may be axially shifted or adjusted with respect to each other. The fastener includes a collar presenting cam surfaces. To those skilled in the art, it will, of course, be understood that the expression "collar" is to be considered in a generic rather than in a specific sense in that this unit need not necessarily include a single annular body. The assembly additionally includes what might be termed a stud and an engaging member carried by the stud and contactable with the cam surfaces of the collar for securing the parts of the assembly against displacement with respect to each other.

Due to the permissive tolerances in sheet manufacture or varying thicknesses or other peculiarities of the layers or other elements which are maintained against displacement by the cooperation of the stud and collar, it sometimes becomes necessary to axially adjust certain of the parts of the fastener with respect to others of the same. Such adjustment will assure a firm and proper contact between the engaging member carried by the stud and the cam surfaces of the collar, especially if it may readily be made by the operator, while in process of coupling the parts of the assembly. According to this invention, the adjustment is incorporated in the stud assembly. Also, the parts providing for the desired adjustment are disposed in a position immediately available to the operator applying and coupling the assembly. Accordingly, at the time of establishing such coupling, any necessary adjustment may be made. This will assure a perfect cooperation of the fastener parts.

Thus, referring primarily to Figs. 1 to 5 inclusive, it will be seen that the reference numerals 10 and 11 indicate sheets which are to be coupled to each other and maintained against accidental displacement by means of the fastener assembly. These sheets are formed with suitable openings 10a and 11a, respectively to receive and accommodate that assembly. The latter may include a collar 12 formed with wing portions or extensions 13 which are secured to the sheet 11, for example, by means of rivets 14. The collar itself may include an annular body 15 having an inturned flange portion 16 presenting inclined cam surfaces 17 which conveniently terminate in outstanding portions 18 acting as stops. The material of the flange 16 is interrupted as indicated at 19 to provide openings or slits through which a cross pin or member may be projected to subsequently engage the cam surfaces 17. Also, the gauge of the material preferably employed to provide the entire collar as well as the design of the latter is such, that resiliency will be incorporated therein.

Preferably, the aperture or hole 10a in the sheet 10 is defined by a dimpled portion 20. A sleeve in the form of a cylindrical member 21 has its upper end 22 funnel shaped. This portion bears against the inclined surface of the dimple 20 if the latter is employed.

In turn supported within the sleeve is a stud designated generally by the reference numeral 9. The latter conveniently includes a head 23 having its inner surface inclined at an angle corresponding to the inclination of the funnel portion 22. This head, as especially shown in Fig. 4, is formed preferably with cross grooves 24 and 24x, one of which, namely, groove 24, may be deeper than the other, to receive the edge portion of virtually any element by means of which the entire assembly may be turned. The stud is continued below the head in a portion 25 which desirably has a diameter substantially equal to that of the interior of the sleeve. Below this, the stud is continued in the form of a reduced and screw-threaded shank 26.

This shank mounts the member which is to engage the cam surfaces of the collar. This member comprises a body 27 in the form of a nut having a threaded hole 8 which receives the stud shank 26. Extending from this nut are wing portions 28 which constitute the member or pin proper. These wings project through slots 29 formed longitudinally of the sleeve 21. The nut being, therefore, restrained from rotational movement with respect to the sleeve, it follows that if the stud is rotated with respect to the latter the pin assembly will be caused to move longitudinally of the stud. This will vary the distance between the cross pin and the head of the stud assembly.

Tongue portions 30 may conveniently extend from the funnel shaped end 22 and be integral therewith. These portions permit of manipulation of the sleeve and also serve to lock the latter with respect to the stud. To adjust the engaging member or cross pin, it will be assumed that the stud assembly is associated in any desired manner with one sheet or other mounting element 10. The collar is mounted on the other sheet 11 by rivets 14. The entire stud assembly is rotated until the ends of the engaging member or cross pin contact the stops 18. Thereupon, this member is restrained against further rotation. Therefore, the sleeve member is likewise restrained. It follows that continued rotation of the head portion 23 will cause the cross pin or engaging member to be shifted axially of the stud shank. This shifting will continue until the inner edges of the cross pin are in proper engaging contact with those parts of the cam surfaces which are adjacent the stops of the collar. If some further manipulation of the sleeve is required at this time, this may readily be achieved by grasping and moving the tongue portions 30 while restraining the shank 26. Thereupon, the tongue portions are bent in the manner shown in Figs. 1 and 4 to lie within the grooves 24 and 24x. When positioned in this manner, it is obvious that the entire stud assembly (including the sleeve) will rotate as a unit if the head 23 is rotated.

In using a fastener of this type—and as afore brought out—the stud assembly is associated with one of the elements and the collar is associated with the other of the elements to be secured against relative movements. The stud is introduced through the bore of the collar with the cross pin 28 passing through the slots 19. If, now, the operator discovers that the cross pin extends at too great or too small a distance from the head of the stud assembly and in order to properly engage the cam surfaces 17, he will resort to the adjustment described in the preceding paragraph. Thereafter, he may lock the parts as afore described. When the stud assembly has its component parts locked against movement, the device may be rotated as a unit. In such rotation, the wing or wings constituting the cross pin will ride against the cam surface or surfaces 17. In so doing, they will draw the elements 10 and 11 towards each other and into intimate contact. This movement will continue until the pin comes to lie in the depressed portions 31 formed at points short of the stop portions. Due to the inherent resiliency of those portions of the collar which are engaged by the cross pin, the latter may ride over the surfaces without the parts wedging. At the same time, it will be observed that, as a consequence of the tabs 31', the flexing of the collar will be limited; these tabs serving to prevent portions of the collar (other than the extensions 13) from improperly bearing against the surface of the sheet. A turning of the stud assembly beyond its proper position is prevented by the stops 18.

In the event that it is desired to employ a rigid cam collar, a unit such as is illustrated in Fig. 6 may be employed. In that unit, the collar 32 is formed of substantially rigid material and may be secured to the sheet 11 or other element in any desired fashion. The stud assembly may be identical with the stud assembly just described excepting only that a spring-bearing portion in the form of a shoulder 33 may be provided adjacent the point of juncture of the funnel shaped portion 22' and the body of the sleeve 21'. A spring 34 has one of its ends bearing against this shoulder or portion while its opposite end bears against the base of a cup 35 encircling the stud assembly. Adjacent its upper edges, this cup may be flared outwardly to engage inwardly flared portions 37 of a grommet 36. The cup 35 lies above the base portion 38 of the collar and through which the usual slot or slots are formed.

As will be appreciated, this form of mechanism functions in the same manner as the assembly shown in Figs. 1 to 5 inclusive. As the wings or ends of the cross pin ride over the cam surfaces of the collar, the latter—instead of yielding—will remain rigid. However, the spring 34 will permit the stud assembly to move axially as it is rotated. This is conceding that the position of the cross pin has been adjusted lengthwise of the stud and in the manner aforedescribed.

Finally, referring to Fig. 7, it will be seen that a construction substantially identical with that illustrated in Fig. 6 has been shown. However, in Fig. 7, the cup member 39 does not bear against a grommet. Rather, this member is extended as indicated at 40 to provide portions which overlap and bear against those parts of the face of sheet 10 or its equivalent which are adjacent the opening. In other words, the stud assembly may be readily movable as a unit with respect to the element 10 with which it is associated. However, separation of the assembly from the sheet is normally prevented by having the overall length of the cross pin 28 slightly in excess of the diameter of the opening through the plate 10. Under such circumstances, it will be necessary to deliberately manipulate the stud assembly in order to withdraw or detach the same from the plate.

From the foregoing, it will be appreciated that among others the several objects of the invention as specifically aforenoted are achieved. Obviously, numerous changes in construction and rearrangements of the parts might be resorted to without departing from the spirit of the invention as defined by the claims.

I claim:

1. A fastener stud assembly including, in combination, a screw-threaded stud, a head forming a part of such stud, a sleeve concentrically disposed with reference to said stud, a portion of said sleeve extending adjacent to said head, a nut mounted upon said stud, the sleeve having opposed axial slots therein, wing portions forming a part of said nut and extending through said slots, and means adjacent the stud head to permit the stud to be rotated relative to said sleeve to shift said nut axially with respect to said stud, said means adapted to be locked against relative rotation with respect to said head.

2. A fastener including a stud assembly comprising a slotted sleeve, a screw threaded stud member disposed within and rotatable with respect to said sleeve, a nut mounted upon said stud member, and a projecting portion forming a part of said nut and extending through the slot in said sleeve and means for locking said sleeve and screw-threaded stud member against relative rotation, whereby said entire stud assembly may be rotated as a unit.

3. A fastener including a stud assembly comprising a slotted sleeve member, a screw-threaded stem disposed within said sleeve member, means permitting the stem to be rotated relative to the sleeve member, means for locking said sleeve and screw-threaded stem against relative rotation, a nut carried by said stem, a cross-pin carried by said nut and extending through the slots in said sleeve, a head portion forming a part of said assembly, a cup loosely encircling said sleeve, and a spring interposed between said head portion and the base of the cup.

4. In a fastener a stud assembly including a slotted sleeve, an outwardly flared portion adjacent one end of said sleeve, manipulating and locking tongues projecting from said outwardly flared portion, a screw-threaded stem disposed within said sleeve, a head forming a part of said stem and arranged within said outwardly flared portion; said head being formed with a groove to receive said manipulating and locking tongues, and a cross pin mounted upon said screw-threaded stem and having its ends extending through the slots in said sleeve and beyond the same.

5. A stud comprising a screw-threaded member provided on one end with a head and having a threaded shank member adapted to be positioned within and extend through a hole in a mounting member, a cross pin provided with a central threaded opening to receive and to be axially movable on said threaded shank member and means manually operable from a position adjacent the stud head and on the stud head side of the mounting sheet to lock said cross pin and screw threaded member against relative rotation.

6. A fastener including a sleeve having opposed axial slots extending upwardly a substantial distance from the bottom of the sleeve, said sleeve having an outwardly-flared portion at its top and a narrow locking deformable tab adjacent the periphery of said outwardly-flared portion, a screw-threaded member provided with a head adapted to fit within said outwardly-flared portion of the sleeve and having a threaded shank portion disposed concentrically within the bottom slotted portion of said sleeve, and a cross-pin mounted upon the threaded portion of the shank and having its ends extending through the opposed axial slots in said sleeve and beyond the same, said head being provided with a groove to receive said tab upon the tab being deformed therein, whereby relative rotation between said screw-threaded portion and said sleeve is prevented, thereby preventing rotational movement of said cross pin relative to said screw-threaded member.

REX W. ALLEN.